United States Patent
Schaefer

(10) Patent No.: US 12,025,016 B2
(45) Date of Patent: Jul. 2, 2024

(54) COMPRESSOR HOUSING

(71) Applicant: BorgWarner Inc., Auburn Hills, MI (US)

(72) Inventor: Wolfram Schaefer, Kleinkarlbach (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/195,446

(22) Filed: May 10, 2023

(65) Prior Publication Data
US 2023/0392517 A1 Dec. 7, 2023

(30) Foreign Application Priority Data

Jun. 1, 2022 (DE) .......................... 202022103117.7

(51) Int. Cl.
*F01D 25/14* (2006.01)
*F01D 25/12* (2006.01)
(Continued)

(52) U.S. Cl.
CPC ........... *F01D 25/14* (2013.01); *F01D 25/125* (2013.01); *F02C 6/12* (2013.01); *F04D 29/584* (2013.01);
(Continued)

(58) Field of Classification Search
CPC .... F01D 25/14; F01D 25/125; F05D 2220/40; F05D 2240/55; F02C 6/12; F04D 29/584; F02B 39/005
(Continued)

(56) References Cited

U.S. PATENT DOCUMENTS 4,068,612 A * 1/1978 Meiners .................. F01D 25/14
440/89 C
4,107,927 A * 8/1978 Gordon, Jr. ........... F02B 39/005
417/407
(Continued)

FOREIGN PATENT DOCUMENTS

| DE | 102010030516 A1 * | 12/2011 | ............. F01D 25/14 |
| WO | WO-2010009945 A2 * | 1/2010 | ............. F01D 25/14 |
| WO | 2020074183 A1 | 4/2020 | |

OTHER PUBLICATIONS

Translation—DE-102010030516-A1 (Year: 2023).*
(Continued)

*Primary Examiner* — J. Todd Newton
(74) *Attorney, Agent, or Firm* — Howard & Howard Attorneys PLLC

(57) ABSTRACT

A housing includes a seal, a first portion for receiving a first axial portion of a rotor, and a second portion for receiving a second axial portion of the rotor. The first portion includes a first cooling system having a cooling channel through which cooling medium flows and a first cooling channel intake, and a first abutment face which surrounds the first cooling channel intake. The second portion includes a second cooling system having a cooling channel through which cooling medium flows and a second cooling channel intake, and a second abutment face which surrounds the second cooling channel intake. The housing portions are connected so that the abutment faces rest on each other and the cooling channel intakes form a transition surrounded by the abutment faces. The seal is arranged between the abutment faces and extends around the transition and is spaced apart from the cooling channel intakes.

19 Claims, 5 Drawing Sheets

(51) Int. Cl.
*F02C 6/12* (2006.01)
*F04D 29/58* (2006.01)

(52) U.S. Cl.
CPC ...... *F05D 2220/40* (2013.01); *F05D 2240/55* (2013.01)

(58) Field of Classification Search
USPC ........................................................ 415/116
See application file for complete search history.

(56) References Cited

U.S. PATENT DOCUMENTS

| | | | | |
|---|---|---|---|---|
| 9,567,870 | B2* | 2/2017 | Bogner | F02C 6/12 |
| 9,816,395 | B2* | 11/2017 | Fukuda | F01D 25/30 |
| 2013/0323020 | A1* | 12/2013 | Bogner | F02B 39/005 |
| | | | | 415/116 |
| 2013/0323021 | A1* | 12/2013 | Bogner | F04D 29/584 |
| | | | | 415/116 |
| 2013/0323022 | A1* | 12/2013 | Bogner | F01D 25/14 |
| | | | | 415/116 |
| 2015/0300202 | A1* | 10/2015 | Maeda | F02B 39/005 |
| | | | | 415/180 |
| 2016/0273551 | A1* | 9/2016 | Uesugi | F02G 5/00 |
| 2021/0215171 | A1* | 7/2021 | Fujita | F04D 17/10 |
| 2022/0112818 | A1* | 4/2022 | Marques | F04D 17/10 |

OTHER PUBLICATIONS

English language abstract and machine-assisted English translation for WO 2020/074183 A1 extracted from espacenet.com database on May 10, 2023, 9 pages.

* cited by examiner

COMPRESSOR HOUSING

CROSS-REFERENCE TO RELATED APPLICATIONS

This application claims priority pursuant to 35 U.S.C. 119(a) to German Patent Application No. 202022103117.7 filed Jun. 1, 2022, which application is incorporated herein by reference in its entirety.

BACKGROUND

A turbocharger which is arranged in a vehicle comprises a housing having a compressor housing and a bearing housing. A rotatable compressor wheel is arranged in the compressor housing. The compressor wheel is connected to a shaft which extends through the bearing housing. With an exhaust gas turbocharger, the shaft is still connected to a turbine wheel in a turbine housing, the rotation of which drives the compressor wheel via the shaft. The turbine housing is also part of the housing. The rotation of the compressor wheel can be electrically supported by means of an electric motor or alternatively driven only by the electric motor. A turbocharger having an electric motor is also referred to as an E-turbocharger.

For cooling, both the compressor housing and the bearing housing have a cooling system through which a fluid cooling medium flows. Such a cooling system may, for example, be constructed annularly in the housing wall as a so-called cooling water jacket.

The cooling systems in the compressor housing and in the bearing housing may be connected by means of external pipelines which extend outside the housing or other external fluid couplings in order to enable a cooling medium exchange between the cooling systems. The pipelines or couplings require not only material expenditure but also space. In addition, they can have a negative influence on the flow behavior of the cooling medium. Alternatively, the cooling systems may be separated from each other so that for each cooling system a supply line and a discharge line for cooling medium is required, which requires at least four interfaces for external connections. This requires additional material expenditure and space for the supply lines and discharge lines.

WO 2020/074183 A1 describes an exhaust gas turbocharger which in addition to a cooling system in the bearing housing has a cooling system in the compressor housing. Both cooling systems are combined with each other by means of a connection element.

SUMMARY

An object is to provide an improved housing.

The object is achieved with a housing, in particular a housing of a charger for an internal combustion engine or a fuel cell, having the features of claim 1.

The housing for receiving a rotor having a compressor wheel and shaft comprises a first housing portion which is provided for receiving a first axial portion of the rotor. It comprises a first cooling system having a cooling channel through which cooling medium flows and a first cooling channel intake and a first abutment face which surrounds the first cooling channel intake. The housing comprises a second housing portion which is provided for receiving a second axial portion of the rotor. It comprises a second cooling system having a cooling channel through which cooling medium flows and a second cooling channel intake and a second abutment face which surrounds the second cooling channel intake, and a cooling medium seal. The first housing portion and the second housing portion are connected so that the first abutment face and the second abutment face rest on each other and the first and the second cooling channel intakes form a cooling medium transition which is surrounded by the first and second abutment face, wherein there is arranged between the first and the second abutment face the cooling medium seal which extends around the cooling medium transition and which is spaced apart from the first and second cooling channel intakes.

The rotor comprises the rotating components inside the housing. The housing is advantageously a housing of a charger for an internal combustion engine or a fuel cell, that is to say, a turbocharger housing or a fuel cell charger housing which receives at least the shaft and compressor wheel. The housing may be provided for an exhaust gas turbocharger. The rotor thereof comprises a compressor wheel, a shaft and a turbine wheel. Alternatively, the housing may be in the form of a housing of an E-turbocharger, the rotor of which is constructed with or without a turbine wheel and in which an electric drive supports or drives the compressor. Both the exhaust gas turbocharger and the E-turbocharger compress air for an internal combustion engine. Alternatively, the housing may be provided for a charger in a fuel cell for driving the vehicle. Such a fuel cell charger comprises an electric drive for the compressor wheel, by means of which air for the fuel cell is compressed. The fuel cell charger is a machine which can operate with or without an expander step.

The housing is constructed in at least two pieces. In one embodiment, the axial portions of the rotor are the compressor wheel, on the one hand, and the shaft, on the other hand. In such an embodiment, the first housing portion for receiving a first axial portion, that is to say, the compressor wheel, of the rotor is a compressor housing, and the second housing portion for receiving a second axial portion, that is to say, the shaft, of the rotor is a bearing housing. Both the compressor housing and the bearing housing may be constructed in one piece. The rotatable compressor wheel can be arranged in the compressor housing. The compressor wheel is connected to the shaft which extends through the bearing housing. With turbochargers or fuel cell chargers having a turbine, another turbine housing is provided. With purely electrically driven turbochargers or fuel cell chargers without a turbine, this is not the case. With electrically supported turbochargers or fuel cell chargers, both an electric motor and a turbine are provided. The electric motor of electrically driven or supported turbochargers or fuel cell chargers is also arranged in the housing.

In an alternative embodiment, the compressor housing is constructed in two pieces. The first housing portion for receiving a first axial portion of the rotor is a compressor front housing and the second housing portion for receiving a second axial portion of the rotor is a compressor rear housing. Advantageously, the compressor front housing receives the compressor wheel. The compressor rear housing forms a rear wall of the chamber in which the air is compressed and which also comprises a diffusor. With electrically driven or supported turbochargers or fuel cell chargers, the electric motor can be arranged in the compressor housing, in particular in the compressor rear housing.

The first cooling system serves to cool the components in the first housing portion and discharges the heat by means of a fluid cooling medium which flows through the cooling channel. The cooling medium may, for example, be water. The cooling channel is a hollow space in the wall of the first housing portion which extends, for example, in an annular manner around the rotor. With a compressor housing, the cooling channel extends in an annular manner around the compressor wheel.

The second cooling system in the second housing portion discharges the heat by means of the cooling medium which flows through the cooling channel. The cooling channel is a hollow space in the wall of the second housing portion. In a bearing housing, the cooling channel runs as a ring in the manner of a cover around the shaft.

The first housing portion has a first abutment face and the second housing portion has a second abutment face. The abutment faces face each other and abut each other so that they touch each other. They do not have to extend in a planar manner, but instead may have, for example, projections, recesses, edges, steps, curvatures or similar structural features which facilitate the orientation and centering of the first and second housing portion. This can be achieved when one of the abutment faces is constructed in such a manner that it engages in an axial direction in the other abutment face, for example, by a step engaging in the other abutment face. The axial direction is the rotation axis of the rotating components in the housing.

The first cooling channel intake is an interface of the first cooling system. In the first cooling channel intake, the cooling channel opens in the first abutment face which surrounds the first cooling channel intake. The second cooling channel intake is an interface of the second cooling system. In the second cooling channel intake, the cooling channel opens in the second abutment face, which surrounds the second cooling channel intake. The cooling channel intakes are delimited by the abutment faces which rest one on the other. In other words: the first cooling channel intake is the region which is facing the second housing portion and on which the second housing portion is not positioned on the first housing portion but which is surrounded by the first and second abutment faces. This also applies accordingly to the second cooling channel intake.

The edge of the first cooling channel intake may at least in a portion be an inner edge of the first abutment face at which the first abutment face and another housing side meet each other at an angle. The other housing side may, for example, be in the form of a tubular opening of the cooling channel. Alternatively, the edge of the first cooling channel intake is in a region in which the first abutment face and the adjacent region of the cooling channel intake extend in a plane. This occurs, for example, when the second tubular cooling channel intake is arranged concentrically on the first tubular cooling channel intake, but the second tubular cooling channel intake has a larger diameter and surrounds the planar region in which the first tubular cooling channel intake opens.

Advantageously, an upper side of the cooling channel intake does not protrude beyond the abutment face but is instead recessed in the same plane or from the other housing portion. The edge can but does not have to extend in a plane. For the edge of the second cooling channel intake, the above statements apply accordingly.

The first cooling channel intake and the second cooling channel intake are interfaces of the first or the second cooling system. In a state positioned one on the other so that the first and second abutment face rest on each other, they form the cooling medium transition. With tubular first and second cooling channel intakes of the same shape and the same diameter, the edges of which rest one on the other, the cooling medium transition is constructed in a similar manner to a pipe connection with abutting pipe ends, wherein the cooling medium transition in this embodiment has neither a graduation nor an expansion.

Alternatively, the cooling medium transition may have edges, as for the above-described embodiment of two tubular end regions as channel transitions, but with the end regions having different diameters.

In another embodiment, at least one of the cooling channel intakes is in the form of an end region, which is expanded with respect to the abutment face, of the cooling channel. Such an end region may, for example, be expanded as a funnel-like or dome-like opening region in the direction toward the abutment face. In one embodiment, the expanded end regions of the first and second cooling channel intake form a hollow space which alone as a result of its increased volume produces an increased cooling action in the transition region between the mutually connected housing portions. As a result of the shaping of the hollow space, the cooling action thereof can be further influenced.

The cooling medium transition is surrounded laterally by the abutment faces which rest one on the other and which act as sealing faces. Nonetheless, there is provided between the abutment faces a cooling medium seal which is constructed to prevent or reduce the discharge of the cooling medium fluid. The properties with regard to structure and material of such a cooling medium seal may differ from the properties of other seals in the housing which, for example, are intended to prevent the discharge of gas or oil. The cooling medium seal is spaced apart from the first and second cooling channel intake so that, with cooling channel intakes which are placed directly one on the other, it is neither positioned on the cooling channel intake edge nor does it act as an edge-side connection means. Since the cooling medium seal is spaced apart from the cooling medium transition, the abutment faces extend at both sides of the cooling medium seal. The cooling medium seal is advantageously annular and may, for example, be in the form of an O-ring.

The interface connection inside the housing between the first housing portion and the second housing portion is an integral component of the connection between the first housing portion and the second housing portion. In comparison with a conventional housing, the abutment faces are configured in such a manner that they surround the cooling medium transition and form the sealing faces thereof, which results in a simple production. Based on a conventional design, the connection region of the first housing portion and second housing portion can be adapted in terms of its configuration as a compressor housing and bearing housing. Additional connection lines or means for connecting the first and second cooling system are not required so that the fewest possible external interfaces for the cooling medium are provided. Only one additional cooling medium seal which surrounds the cooling medium transition is required. The number of supply lines and discharge interfaces for water and oil in comparison with a conventional bearing housing cooling also does not increase. Only one cooling medium supply line and one cooling medium discharge line are required overall for the first and second cooling system. The spatial requirement of the housing is small and comparable with that of an air-cooled turbocharger housing. In spite of improved cooling, structural size provisions from the user can thus be complied with as before.

In one embodiment, the cooling medium seal is arranged in a groove in at least one of the abutment faces so that it is retained in a predetermined position and the abutment faces can have direct contact. With at least one abutment face which is constructed in a stepped manner, the seal can extend along a stepped edge of the stepped abutment face. On the stepped edge, two housing wall regions which are arranged at an angle meet each other.

In one embodiment, the cooling medium seal may extend around the cooling medium transition in such a manner that it is located in a central region of the circumferential cooling medium seal. With a cooling medium transition in a peripheral region of the housing, that is to say, in an edge sector of the housing, such a cooling medium seal would then also extend only in a peripheral sector of the housing, in particular without extending around the longitudinal axis of the housing. The longitudinal axis corresponds to the rotation axis of the rotating components.

In an alternative embodiment, the cooling medium seal runs around the longitudinal axis so that it extends along the circumferential edge region of the housing. The region surrounded by the cooling medium seal is in this embodiment significantly larger than the actual cooling medium transition.

One or more housing seals may be provided as additional seals, in particular for gas sealing, between the first and the second abutment face or in other regions of the housing. The cooling medium seal may extend inside the additional housing seal or extend around the housing seal or extend outside the housing seal without surrounding it so that many varied possibilities are provided for the arrangements of the seals.

In one embodiment, the cooling medium transition is in the form of a cooling-medium-guiding, annular hollow space at a rear side of the compressor housing, in particular for diffusor cooling. This diffusor cooling uses with little adaptation of the design a cavity between a rear side of the compressor housing and the bearing housing, which is even provided with a conventional housing without any cooling function and thus enables a compressor cooling in combination with a diffusor cooling and a bearing cooling in the same cooling system.

BRIEF DESCRIPTION OF THE DRAWINGS

A number of embodiments are explained below in greater detail with reference to the drawings, in which.

In the Figures, components which are identical or which have the same function are given the same reference numerals.

DETAILED DESCRIPTION

Figure 1:
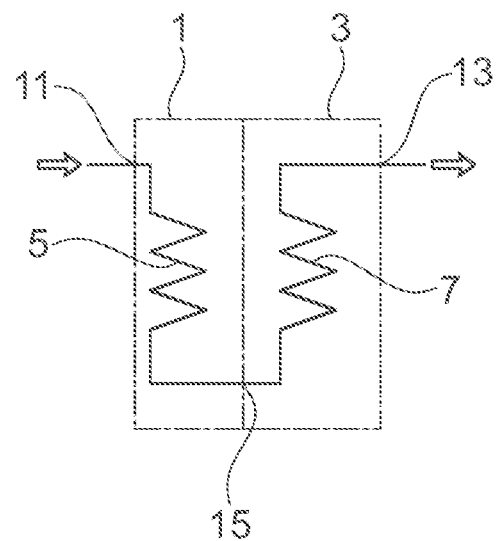
FIG. 1 shows a schematic example of a cooling medium flow through a housing.

FIG. 1 schematically shows an exemplary cooling medium flow through a housing for a turbocharger with a compressor housing 1 and a bearing housing 3 which are illustrated as blocks. The compressor housing 1 comprises a first cooling system 5 having a cooling channel through which a fluid cooling medium, for example, water flows. The first cooling system 5 comprises two interfaces through which the cooling medium flows in and flows away. The bearing housing 3 comprises a second cooling system 7 having a cooling channel through which the cooling medium flows. The second cooling system 7 comprises two interfaces through which the cooling medium flows in and flows away.

The interface of the first cooling medium system 5, through which cooling medium flows away, is connected as a cooling medium interface 15 to the interface of the second cooling medium system 7 through which cooling medium flows in so that the cooling medium flows from an interface of the first cooling medium system 5 in the form of an inlet 11 through the first cooling medium system 5 via the cooling transition 15 to the second cooling medium system 7 and flows away through an interface of the second cooling medium system 7 in the form of an outlet 13. The interfaces which are connected to each other in the cooling medium transition 15 are referred to as the first cooling channel intake, which is part of the first cooling medium system 5, and as a second cooling channel intake, which is part of the second cooling medium system 7. The coupling of the first and second cooling channel intake in the cooling medium transition 15 has the advantage that with only two external intakes, that is to say, the inlet 11 and outlet 13, both the compressor housing 1 and the bearing housing 3 are cooled.

Such a housing uses a contact face of the bearing housing 3 and compressor housing 1 to form the connected interfaces between the cooling systems 5, 7. The cooling channels of the cooling systems 5, 7 are formed by means of the configuration of the metal housing, which may, for example, be cast. They are hollow spaces in the housing wall. In order to prevent the discharge of fluid cooling medium, a cooling medium seal, for example, an O-ring which extends in the contact face is provided.

Figure 2:
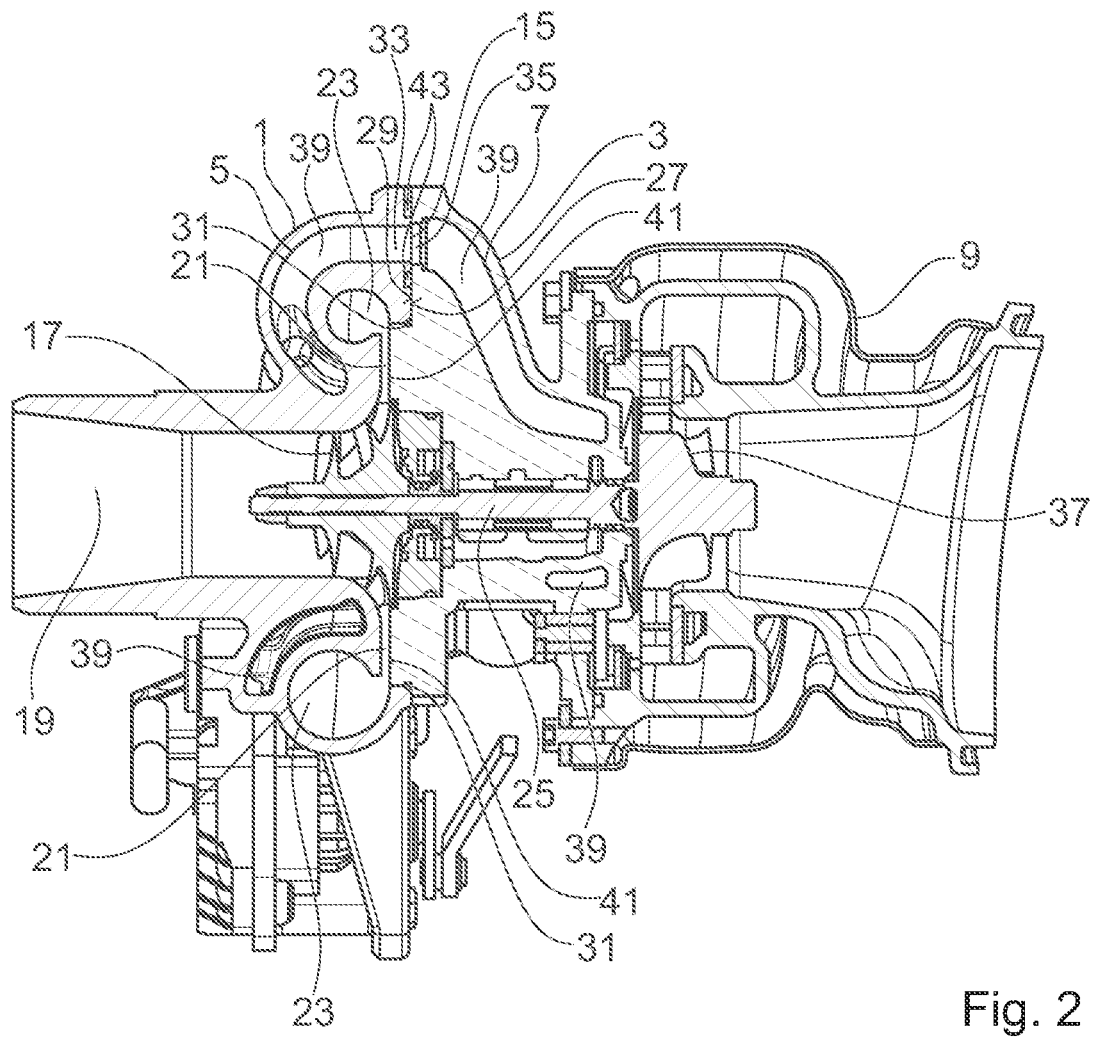
FIG. 2 shows a sectioned illustration through an embodiment of a turbocharger.

FIG. 2 shows a sectioned illustration through an embodiment of a turbocharger having a compressor and a turbine. The turbocharger is an exhaust gas turbocharger. The housing comprises a compressor housing 1 as a first housing portion, a bearing housing 3 as a second housing portion and a turbine housing 9 as another housing portion. The connection of the housing portions may, for example, be carried out by means of direct screwing at the compressor side and clamping plate connection at the turbine side.

The compressor comprises a compressor wheel 17, which is arranged in the compressor housing 1. The compressor housing 1 forms an air inlet 19, through which air which is intended to be compressed flows and is compressed and accelerated in the compressor by means of the rotating compressor wheel 17. The radially discharged air passes through a diffusor 21 which reduces the air speed, and then flows into a volute 23 which extends around the compressor wheel 17. In the volute 23, the air is collected and the speed thereof is further reduced as far as the compressor outlet. In the compressor housing 1, there is provided a first cooling system 5 having an annular cooling channel 39 through which cooling medium flows and which has an annular hollow space which extends between the compressor wheel 17 and the volute 23 in the wall of the compressor housing 1.

The turbine comprises the turbine wheel 37 which is arranged in the turbine housing 9. The turbine wheel 37 is caused to rotate by means of an exhaust gas flow.

The compressor wheel 17 is connected to the turbine wheel 37 in a rotationally secure manner by means of a shaft 25 so that the rotation of the turbine wheel 37 is transmitted to the compressor wheel 17. The rotating components form the rotor. The shaft 25 extends through the bearing housing 3 which protects it, retains it and in which bearings for the shaft 25 are arranged. A longitudinal axis of the housing extends along a rotation axis of the rotating components of the rotor. In the bearing housing 3 there is provided a second cooling system 7 with an annular cooling channel 39 through which cooling medium flows and which extends around the shaft 25 in the bearing housing wall.

The compressor housing 1, the bearing housing 3 and the bearing housing 9 are connected to each other. The compressor housing 1 has a first abutment face 27 which faces the bearing housing 3. The bearing housing 3 has a second abutment face 29 which faces the compressor housing 1. The first and second abutment faces 27, 29 rest one on the other and extend in an annular manner around the longitudinal axis in the circumferential peripheral region of the turbocharger, that is to say, in the outer region of the housing.

The second abutment face 29 is in this embodiment constructed in a stepped manner so that the first abutment face 27 of the compressor housing 1 engages laterally around the step 41 and the step 41 protrudes into the compressor housing 1. The step 41 forms the rear wall of the compressor and thus forms the diffusor 21 through which air flows from the compressor wheel 17 into the volute 23. In the step edge, an annular housing seal 31 extends around a central region, through which the longitudinal axis extends, of the housing. This housing seal 31 prevents gas discharge from the volute 23.

In a segment of the peripheral region, a first cooling channel intake 33 of the first cooling system 5 opens in the first abutment face 27 of the compressor housing 1 so that the first cooling channel intake 33 is surrounded by the first abutment face 27. A second cooling channel intake 35 of the second cooling system 7 opens in the second abutment face 29 of the bearing housing 3 so that the second cooling channel intake 35 is surrounded by the second abutment face 29. The abutment faces 27, 29 are planar in the opening regions. The first and second cooling channel intake 33, 35 have the same shape and are arranged so as to be orientated with respect to each other so that they form between the first and second cooling system 5, 7 a tubular coolant transition 15 which is surrounded by the abutment faces 27, 29 which act as sealing faces. There is arranged between the abutment faces 27, 29 which rest on each other a cooling medium seal 43 which extends around the cooling medium transition 15 and which is spaced apart from the first and second cooling channel intakes 33, 35. The cooling medium seal 43 is arranged outside the housing seal 31. The cooling medium seal 43 may, for example, be in the form of an O-ring or a rubber seal.

Figure 3:
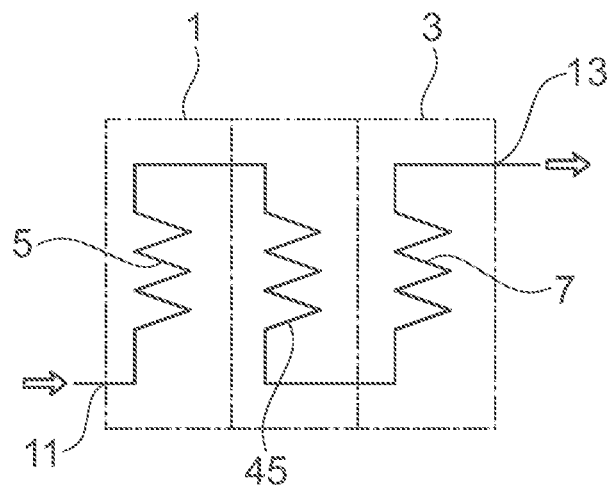
FIG. 3 schematically shows another example of a cooling medium flow through a housing.

FIG. 3 schematically shows an exemplary cooling medium flow through another housing for a turbocharger which comprises a compressor housing 1 and a bearing housing 3. The compressor housing 1 comprises a first cooling system 5 having a cooling channel through which the cooling medium flows. The first cooling system 5 comprises two interfaces through which the cooling medium flows in and flows away. The bearing housing 3 comprises a second cooling system 7 having a cooling channel through which the cooling medium flows. The second cooling system 7 comprises two interfaces through which the cooling medium flows in and flows away. Between the first and second cooling system 5, 7 a rear wall cooling system 45 for the diffusor 21 is provided at a rear side of the compressor. The cooling medium flows from an inlet 11 in the first cooling medium system through the first cooling medium system 5 to the rear wall cooling system 45 and from there to the second cooling medium system 7 and leaves it via an outlet 13. The rear wall cooling system 45 is formed by the interfaces of the first and second cooling system 5, 7 which are constructed in such a manner that the cooling medium during the transition between the first and second cooling system 5, 7 flows along the rear wall of the compressor and thereby cools the diffusor 21.

Such a housing may use a gap between the bearing housing 3 and the diffusor rear side as a cooling region in order to form the rear wall cooling system 45 and additionally has a radial connection channel, in particular at the compressor side of the connection face, as a connection with respect to the first cooling system 5.

Figure 4:
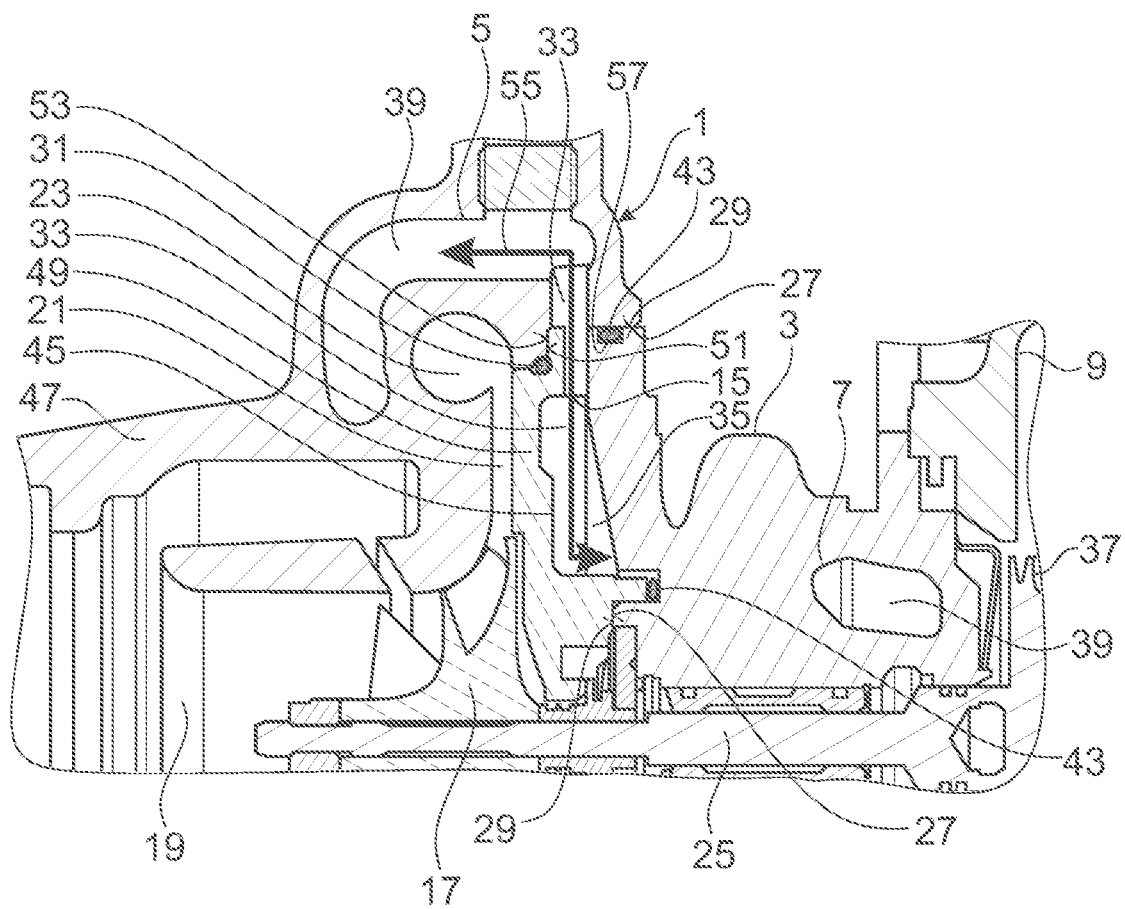
FIG. 4 shows a sectioned illustration through another embodiment of a turbocharger.

FIG. 4 shows a sectioned illustration through a region of another embodiment of a housing for a turbocharger having a compressor and a turbine. The turbocharger is an exhaust gas turbocharger. The housing comprises a compressor housing 1, a bearing housing 3 and a turbine housing 9.

The compressor comprises a compressor wheel 17 which is arranged in the compressor housing 1. The compressor housing 1 is constructed in two pieces and has a compressor front housing 47 and a compressor rear housing 49 which is connected to the compressor front housing 47. The compressor front housing 47 for the compressor wheel 17 has an air inlet 19 through which air which is intended to be compressed flows onto the compressor wheel 17 and a volute 23 which extends around the compressor wheel 17 and through which the compressed air flows out of the compressor. In the compressor housing 1 there is provided a first cooling system 5 with an annular cooling channel 39 through which cooling medium flows and which extends around the compressor wheel 17 at the inside of the wall of the compressor housing 1. The compressor rear housing 49 is a separate rear wall of the compressor housing 1. Along the rear wall, the compressed air flows from the compressor wheel 17 in the direction of the volute 23. The region through which it flows is also referred to as a diffusor 21. Abutment faces 51, 53 of the compressor front housing 47 and the compressor rear housing 49 rest one on the other and act as a sealing face between which along an edge of the stepped abutment face 53 there extends a housing seal 31 which prevents gas discharge from the volute 23.

The compressor wheel 17 is connected to a turbine wheel 37 in the turbine housing 9 by means of a shaft 25. The shaft 25 extends through the bearing housing 3 which protects the shaft 25, retains it and in which bearings for the shaft 25 are arranged. A longitudinal axis of the turbine housing extends along a rotation axis of the shaft 25, compressor wheel 17 and turbine wheel 37 which as rotating components form the rotor.

There is provided in the bearing housing 3 a second cooling system 7 having an annular cooling channel 38 through which cooling medium flows and which extends around the shaft 25 in the bearing housing wall.

The two-piece compressor housing 1 and the bearing housing 3 are connected to each other. The compressor housing 1 has a first abutment face 27 which faces the bearing housing 3. The bearing housing 3 has a second abutment face 29 which faces the compressor housing 1. The first and second abutment face 27, 29 rest on each other and extend in an annular manner around the longitudinal axis both in a peripheral region of the turbocharger and in a central region adjacent to the shaft 25. With the two-piece compressor housing 1, the first abutment face 27 has regions both on the compressor front housing 47 and on the compressor rear housing 49. In this embodiment, the first and second abutment face 27, 29 extend in the peripheral region parallel with the longitudinal axis so that during assembly a centering of the components is achieved. The first and second abutment face 27, 29 surround a first or second cooling channel intake 33, 35 which form a cooling medium transition 15. The cooling medium transition 15 is in the form of a hollow space which is arranged in an annular manner on the compressor housing rear side and which forms a rear wall cooling system 45 and acts as a diffusor cooling. The hollow space protrudes both into the compressor housing 1 and into the bearing housing 3 and is delimited both internally and externally by the abutment faces 27, 29 which rest on each other. At the outer side, a throughflow to the first cooling system 5 is formed in the compressor housing 1.

In a peripheral region, which extends parallel with the longitudinal axis, of the second abutment face 29 there is a groove 57 in which a cooling medium seal 43 extends. It prevents cooling medium discharge between the compressor front housing 47 and the bearing housing 3. Another seal 43 between the compressor housing 1 and the bearing housing 3 is provided in a central region.

The arrow 55 in FIG. 4 indicates the cooling medium exchange between the compressor housing 1 and the bearing housing 3 via the cooling medium transition 15 which is in the form of a rear wall cooling system 45.

Figure 5:
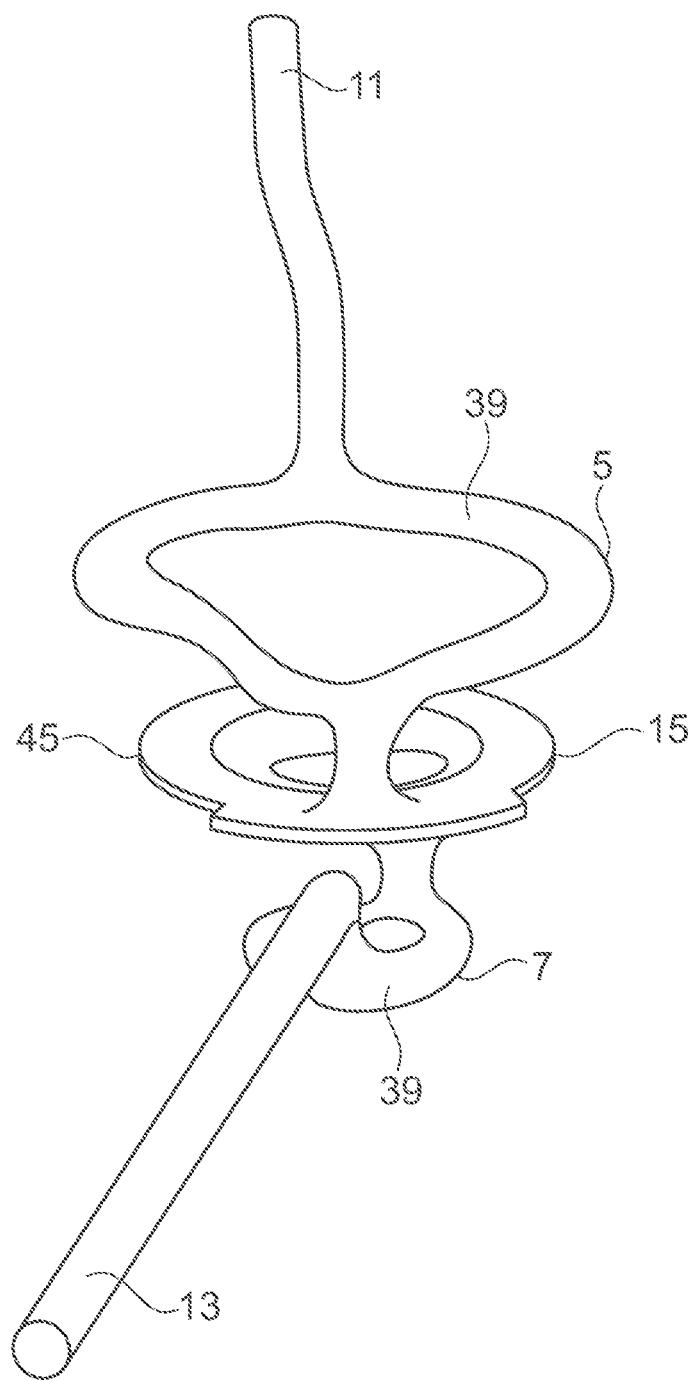
FIG. 5 shows the inner walls of an exemplary cooling system with a first, second and third cooling ring.

FIG. 5 shows in a three-dimensional illustration the inner walls of an exemplary cooling system having a first cooling system 5 and a second cooling system 7 which are connected to each other by means of a cooling medium transition 15 which is in the form of a rear wall cooling system 45 and an inlet 11 and outlet 13. The first cooling system 5 in the compressor housing 1 extends as a first ring around the compressor wheel 17. A second ring, which is formed by the cooling medium transition 15 between the first and second cooling system 5, 7, extends below the diffusor 21 on the compressor rear side and a third ring of the second cooling system 7 runs in the bearing housing 3 around the rotating shaft 21. Between the rings, there are tubular transitions inside the housing. The inlet 11 on the first ring and the outlet 13 on the third ring enable supply or discharge of the cooling medium from the housing.

The cooling medium flow through three rings, as illustrated in FIG. 5, is similar to the cooling medium flow as in the embodiment described in connection with FIG. 4.

Figure 6:
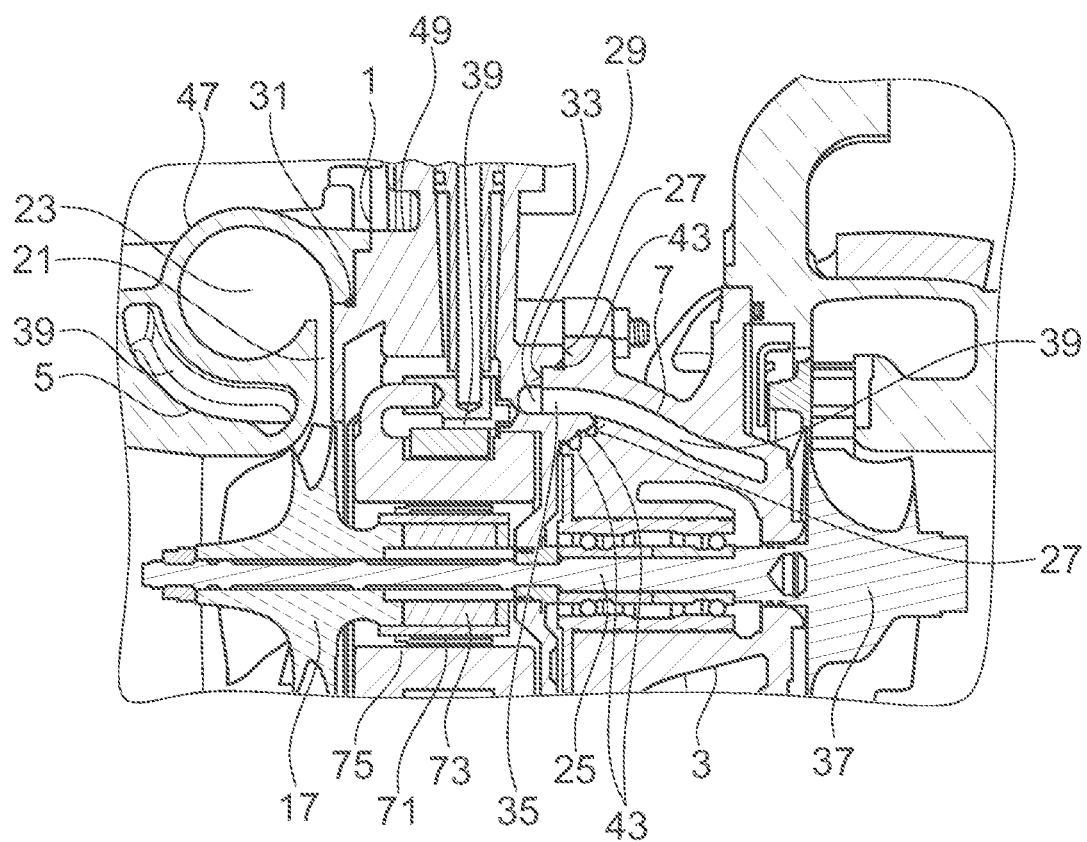
FIG. 6 shows a sectioned illustration through a region of an embodiment of an E-turbocharger.

FIG. 6 shows a sectioned illustration through a region of an embodiment of an E-turbocharger, the compressor wheel 17 and turbine wheel 37 of which are connected by means of a shaft 25. At the rear side of the compressor wheel 17, that is to say, at the side facing the turbine, there is arranged an electric motor 71 by means of which the shaft 25 can be driven or the rotation thereof can be supported. The electric motor 71 comprises a rotating rotor 73 which surrounds a shaft portion and a stator 75 which surrounds the rotor 73. The rotor 73 and stator 75 interact with each other via a time-changeable magnetic field which brings about the rotation of the rotor 73 and consequently of the shaft 25 and the compressor wheel 17.

A housing of the turbocharger comprises a compressor housing 1 in which the compressor wheel 17 and the electric motor 71 are arranged, a bearing housing 3 in which the shaft extends, and a turbine housing, in which the turbine wheel 37 is arranged. The compressor housing 1 is constructed in two pieces and comprises a compressor front housing 47, in which the compressor wheel 17 is arranged, and a compressor rear housing 49 which forms a rear wall of a diffusor 21 and surrounds the electric motor 71. The compressor front housing 47 and the compressor rear housing 49 are connected to each other.

A first cooling system 5 having a cooling channel 39 through which cooling medium flows and a first cooling channel intake 33 is formed in the wall of the compressor housing 1. The cooling channel 39 extends in an annular manner between the compressor wheel 17 and volute 23 in the wall of the compressor front housing 47 and around the electric motor 71 in the compressor rear housing 49. A first cooling channel intake 33 opens in a first abutment face 27 which is positioned on the bearing housing 3.

The bearing housing 3 has in the wall thereof a second cooling medium system 7 which comprises a cooling channel 39 and a second cooling channel intake 35. The cooling channel 39 extends in a cover-like manner around the shaft 25. The second cooling channel intake 35 opens in a second abutment face 29 which is positioned on the compressor housing. The compressor housing 1 and the bearing housing 3 are connected so that the abutment faces 27, 29 rest on each other.

The first and the second abutment face 27, 29 are constructed in a stepped manner so that the bearing housing 3 and the compressor rear housing 49 engage in each other. In the edges of the steps, cooling medium seals 43 extend around the longitudinal axis.

Figure 7:
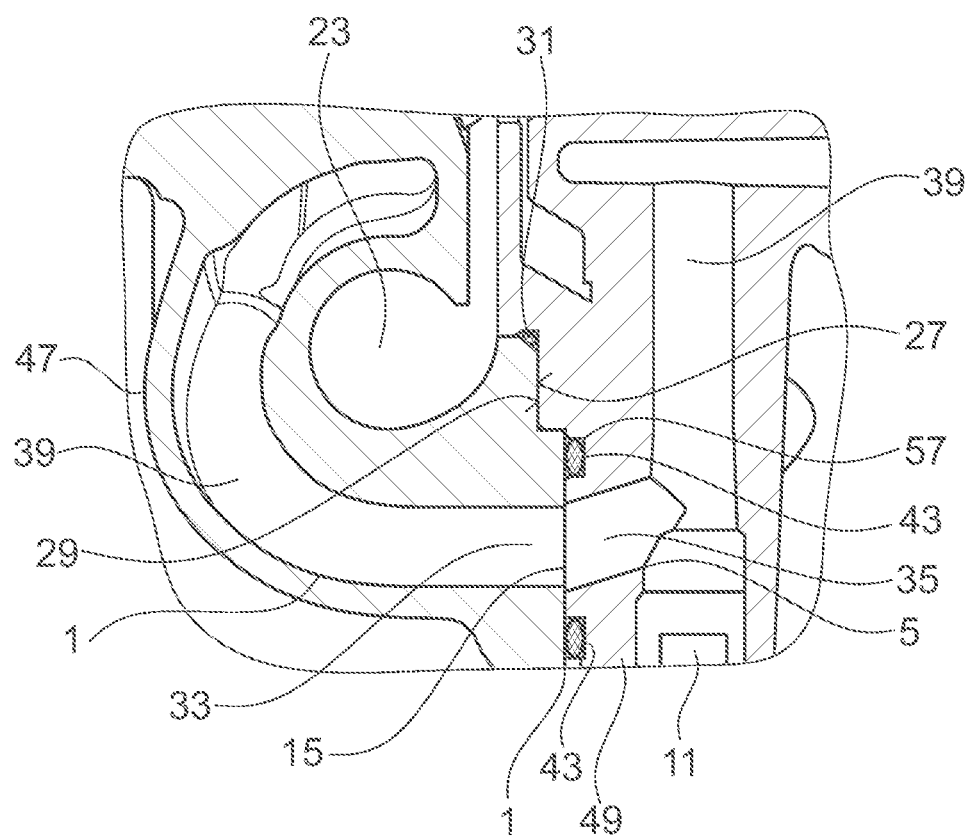
FIG. 7 shows a sectioned illustration through another region of the embodiment of an E-turbocharger.

FIG. 7 shows a sectioned illustration of another region of the embodiment of the E-turbocharger. The cut-out shows the compressor front housing 47 and the compressor rear housing 49 in the region of the volute 23. The first abutment face 27 of the compressor front housing 47 and the second abutment face 29 of the compressor rear housing 49 rest on each other. They are constructed in a stepped manner so that both compressor housing components are centered during assembly. In an edge of the step there extends a housing seal 31 which prevents the gas discharge from the volute 23.

The first cooling system 5 comprises a cooling channel 39 which extends in the compressor front housing 47 and compressor rear housing 49 and in which an inlet 11 to the cooling medium supply laterally opens. The abutment faces 27, 29 surround a cooling channel intake 33, 35 in each case. The two cooling channel intakes 33, 35 are arranged one on the other so that they form a cooling medium transition 15 between the two housing portions 47, 49 of the compressor. Around the cooling medium transition 15 in the compressor, a cooling medium seal 43 extends with spacing from the compressor cooling medium transition 15 in a groove 57 so that a cooling medium discharge is prevented.

This embodiment shows that the cooling medium transition 15 surrounded by abutment faces 27, 29 which rest on each other can be formed not only between the compressor housing 1 and bearing housing 3, but instead alternatively or additionally also between the compressor front housing 47 and compressor rear housing 49.

Another embodiment of an E-turbocharger differs from the previous embodiment in that no turbine is provided and the compressor wheel is driven only electrically.

Embodiments of an electrically driven fuel cell charger with or without expander support driven by a reaction product flow, in particular water vapor from the fuel cell, can at least be constructed in a similar manner to the above-described E-turbocharger and can have cooling systems as in the embodiments described.

The features which are set out above, those set out in the claims and those which can be derived from the drawings can advantageously be implemented both individually and in various combinations. The invention is not limited to the embodiments described but can be modified in many ways within the normal capacities of a person skilled in the art.

REFERENCE NUMERALS

1 Compressor housing
3 Bearing housing
5 First cooling system
7 Second cooling system
9 Turbine housing
11 Inlet
13 Outlet
15 Cooling medium transition
17 Compressor wheel
19 Air inlet
21 Diffusor
23 Volute
25 Shaft
27 First abutment face
29 Second abutment face
31 Housing seal
33 First cooling channel intake
35 Second cooling channel intake
37 Turbine wheel
39 Cooling channel
41 Step
43 Cooling medium seal
45 Rear wall cooling system
47 Compressor front housing
49 Compressor rear housing
51 Abutment face
53 Abutment face
55 Arrow
57 Groove
71 Electric motor
73 Rotor
75 Stator

What is claimed is:

1. A housing for receiving a rotor having a compressor wheel and shaft, the housing comprising:
a first housing portion for receiving a first axial portion of the rotor, the first housing portion comprising;
a first cooling system having a cooling channel through which cooling medium flows and a first cooling channel intake, and
a first abutment face which surrounds the first cooling channel intake,
a second housing portion for receiving a second axial portion of the rotor, the second housing portion comprising;
a second cooling system having a cooling channel through which cooling medium flows and a second cooling channel intake, and
a second abutment face which surrounds the second cooling channel intake, and
a cooling medium seal,
wherein the first housing portion and the second housing portion are connected so that the first abutment face and the second abutment face rest on each other and the first and the second cooling channel intakes form a cooling medium transition which is surrounded by the first and second abutment face,
wherein there is arranged between the first and second abutment face the cooling medium seal which extends around the cooling medium transition and which is spaced apart from the first and second cooling channel intakes,
wherein the first cooling channel intake is in the form of an end region which opens in the first abutment face, and wherein the second cooling channel intake is in the form of an end region that opens in the second abutment face, and
wherein the end region of the first abutment face is oriented axially with respect to the second abutment face and wherein the end region of the second abutment face is oriented axially with respect to the first abutment face such that the cooling channel end sections run in an axial direction parallel with a rotation axis of the received rotor.

2. The housing as claimed in claim 1,
wherein the first housing portion is a compressor housing and the second housing portion is a bearing housing, or
wherein the first housing portion is a compressor front housing and the second housing portion is a compressor rear housing.

3. The housing as claimed in claim 1,
wherein the first cooling channel intake is at least partially surrounded by an inner edge of the first abutment face and/or by a housing region which extends in a plane with the first abutment face adjacent to the housing region, and/or
wherein the second cooling channel intake is at least partially surrounded by an inner edge of the second abutment face and/or by a housing region which extends in a plane with the second abutment face adjacent to the housing region.

4. The housing as claimed in claim 1,
wherein the end region of the first cooling channel intake is expanded in the direction toward the first abutment face of the cooling channel, and/or wherein the end region of the second cooling channel intake is expanded in a direction toward the second abutment face of the cooling channel.

5. The housing as claimed in claim 4,
wherein the cooling medium transition is formed by the expanded end regions of the first and second cooling channel intake which form a hollow space.

6. The housing as claimed in claim 1,
wherein the first abutment face is constructed in a non-planar manner and/or the second abutment face is constructed in a non-planar manner.

7. A turbine housing as claimed in claim 1,
wherein one of the abutment faces is constructed in such a manner that it engages in an axial direction in the other abutment face.

8. The housing as claimed in claim 1,
wherein the first housing portion and/or the second housing portion is constructed in one piece or several pieces.

9. The housing as claimed in claim 1,
wherein the cooling medium transition is a rear wall cooling system.

10. The housing as claimed in claim 9,
wherein the rear wall cooling system has an annular hollow space which guides cooling medium at a rear side of the compressor housing.

11. The housing as claimed in claim 1,
wherein the cooling medium seal is arranged in a groove in at least one of the abutment faces.

12. The housing as claimed in claim 1,
wherein at least one of the abutment faces is constructed in a stepped manner and the cooling medium seal extends along a stepped edge of the stepped abutment face.

13. The housing as claimed in claim 1,
wherein the cooling medium seal is an O-ring.

14. The housing as claimed in claim 1,
wherein the cooling medium seal extends around a longitudinal axis of the housing.

15. The housing as claimed in claim 1,
wherein the cooling medium seal extends in a peripheral region of the housing without extending around a longitudinal axis thereof.

16. The housing as claimed in claim 1,
wherein a housing seal is provided between the first and the second abutment face and the cooling medium seal extends inside the housing seal or extends around the housing seal or extends outside the housing seal without surrounding it.

17. The housing as claimed in claim 2,
wherein the first cooling channel intake is at least partially surrounded by an inner edge of the first abutment face and/or by a housing region which extends in a plane with the first abutment face adjacent to the housing region, and/or
wherein the second cooling channel intake is at least partially surrounded by an inner edge of the second abutment face and/or by a housing region which extends in a plane with the second abutment face adjacent to the housing region.

18. A housing for receiving a rotor having a compressor wheel and shaft, the housing comprising:
a first housing portion for receiving a first axial portion of the rotor, the first housing portion comprising;
 a first cooling system having a cooling channel through which cooling medium flows and a first cooling channel intake, and
 a first abutment face which surrounds the first cooling channel intake,
a second housing portion for receiving a second axial portion of the rotor, the second housing portion comprising;
 a second cooling system having a cooling channel through which cooling medium flows and a second cooling channel intake, and
 a second abutment face which surrounds the second cooling channel intake, and
a cooling medium seal,
 wherein the first housing portion and the second housing portion are connected so that the first abutment face and the second abutment face rest on each other and the first and the second cooling channel intakes form a cooling medium transition which is surrounded by the first and second abutment faces,
 wherein there is arranged between the first and second abutment faces the cooling medium seal which extends around the cooling medium transition and which is spaced apart from the first and second cooling channel intakes, and
 wherein the first abutment face is constructed in a non-planar manner and/or the second abutment face is constructed in a non-planar manner.

19. A housing for receiving a rotor having a compressor wheel and shaft, the housing comprising:
a first housing portion for receiving a first axial portion of the rotor, the first housing portion comprising;
 a first cooling system having a cooling channel through which cooling medium flows and a first cooling channel intake, and
 a first abutment face which surrounds the first cooling channel intake,
a second housing portion for receiving a second axial portion of the rotor, the second housing portion comprising;
 a second cooling system having a cooling channel through which cooling medium flows and a second cooling channel intake, and
 a second abutment face which surrounds the second cooling channel intake, and
a cooling medium seal,
 wherein the first housing portion and the second housing portion are connected so that the first abutment face and the second abutment face rest on each other and the first and the second cooling channel intakes form a cooling medium transition which is surrounded by the first and second abutment faces,
 wherein there is arranged between the first and second abutment faces the cooling medium seal which extends around the cooling medium transition and which is spaced apart from the first and second cooling channel intakes, and
 wherein a housing seal is provided between the first and the second abutment faces and the cooling medium seal extends inside the housing seal or extends around the housing seal or extends outside the housing seal without surrounding it.

* * * * *